June 24, 1930.  J. R. OISHEI  1,768,329

WINDSHIELD CLEANER

Filed Aug. 24, 1926

Inventor
John R. Oishei
by Barton A. Bean Jr.
Atty

Patented June 24, 1930

1,768,329

UNITED STATES PATENT OFFICE

JOHN R. OISHEI, OF BUFFALO, NEW YORK, ASSIGNOR TO TRICO PRODUCTS CORPORATION, OF BUFFALO, NEW YORK

WINDSHIELD CLEANER

Application filed August 24, 1926. Serial No. 131,196.

This invention relates to an auxiliary cleaner for attachment to the automatic or motor driven windshield cleaner of motor vehicles.

In the oscillatory type of automatic windshield cleaners, the wiper is oscillated to clean a comparatively small portion of the windshield area so that the field of vision of the automobile operator is considerably restricted and, at times, the area cleaner is insufficient to accord the operator and passengers the desired range of vision for viewing the traffic conditions ahead.

In order to increase or enlarge the field of vision the motorist has resorted to either of two methods; first the mounting of two spaced and independent automatic cleaners on the windshield, or second, the attachment of an auxiliary cleaner to a single automatic cleaner to be driven by the latter for cleaning an added area of the windshield surface, heretofore uncleaned by the main wiper element and thereby laterally enlarge the field of vision. In view of the fact that the windshield cleaner motor is of a light construction and is designed in an appropriate size to effectively meet the demands made upon it by its sole wiper element, it is desirable that any attachment, in the nature of an auxiliary wiper arm be of a simple construction so that the additional load placed upon the windshield cleaner motor will be as light as is practically possible. Heretofore, in the construction of auxiliary cleaners, specially constructed wiper arms have been devised to replace the original wiper arm of the main cleaner, or, in some instances, special clamps or clips have been devised for attachment to the main cleaner arm, which constructions have been of such nature and character as to place an added weight and burden on the light powered motor of the main cleaner and materially hinder its practical operation.

The object of the present invention is to provide a windshield cleaning mechanism embodying an attachment which may readily be incorporated, in part, in the construction of the main cleaner for enlarging the effectiveness thereof.

A further object is to provide an auxiliary cleaner especially adapted for that type of automatic cleaner in which the main wiper arm is detachably connected to the motor shaft by a tensioning device, the auxiliary cleaner embodying a part adapted to replace a part of said tensioning device whereby the main cleaner arm will not require any modification or attachment for the connection of the auxiliary cleaner.

A further object of the invention is to provide a connector between the main and auxiliary cleaners embodying tensioning means for urging the wipers of each cleaner against the windshield glass.

Figure 1:
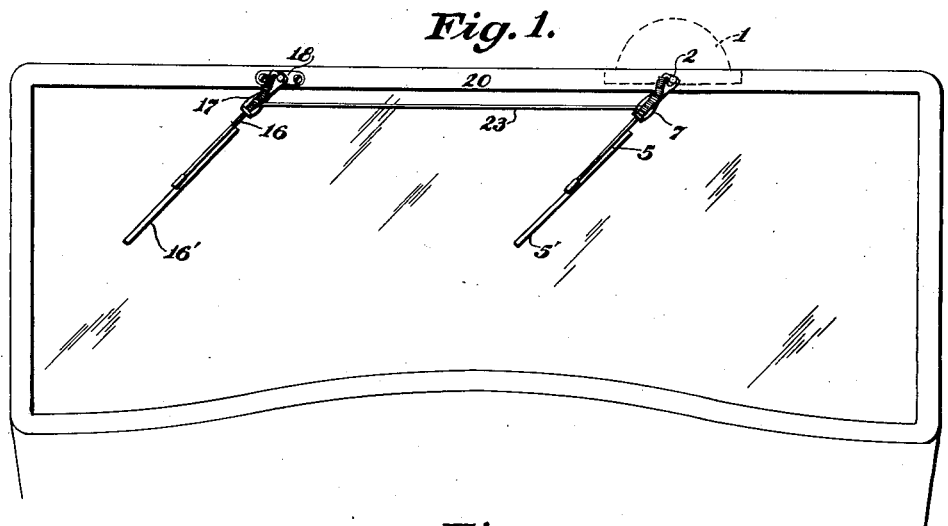
Fig. 1 is a front elevation of a windshield showing a duplex or combined main and auxiliary windshield cleaner.
Figure 2:
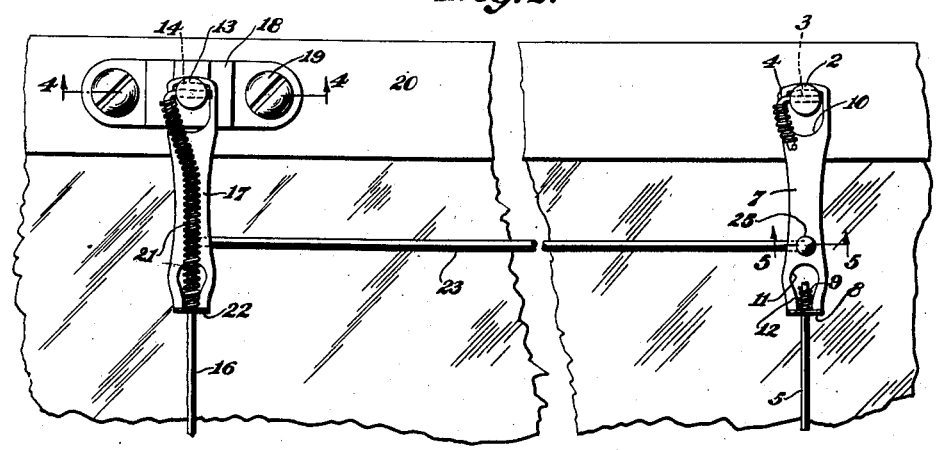
Fig. 2 is an enlarged fragmentary front elevation showing the construction and arrangement of parts more clearly.
Figure 4:
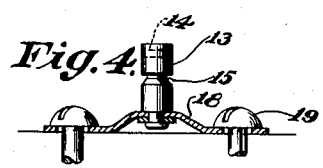
Fig. 4 is a transverse sectional view about on line 4—4 of Fig. 2.
Figure 5:
Fig. 5 is a similar view substantially about on line 5—5 of Fig. 2.
Figure 3:
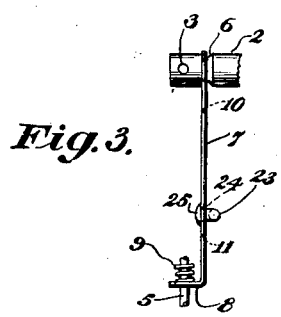
Fig. 3 is a fragmentary side elevation of one of the cleaners, depicting the suspension of a part of the tensioning device.

Referring more in detail to the accompanying drawings, the main windshield cleaner comprises a motor 1, either of the fluid pressure or electrical type, which motor has its shaft 2 formed with a horizontal transverse opening 3 in which the upper angular end 4 of the wiper arm 5 is removably engaged, the lower end of the wiper arm supporting a wiper element 5'.

The shaft 2 is provided with a groove or seat 6 in which the upper end of a stirrup 7 is engaged, the lower end of the stirrup being deflected forwardly to form a foot or step 8 for engaging about the wiper arm 5 and supporting the spring 9 which is compressed between the foot or step 8 and the shaft 2. In the form shown, the upper end of the stirrup 7 is provided with an opening 10 by which the same may be hung on the projecting shaft 2, while the lower end of the stirrup is formed with a key opening having an entrance portion 11 and a restricted portion 12, the latter extending into the foot or step 8. This stirrup may be stamped from sheet metal and enables a ready assembly of the stirrup on the wiper arm, the bent end portion 4, together with the spring 9, being inserted through the entrance portion 11 of the key slot, and then the arm 5, below the spring 9, is shifted into the restricted portion 12 of the slot within the foot or step 8 so that the body portion of the stirrup will lie in a position substantially parallel to the arm 5. In this relation, the foot or step 8 provides a seat for the spring 9 so that when the stirrup and arm are mounted on the shaft 2, with the stirrup engaging in its groove 6, the spring will be under sufficient tension to exert a downward pressure on the foot or step 8 and thereby effect a pulling of the wiper arm toward the windshield glass.

This mounting for the wiper arm of an automatic cleaner is in extensive use at present by the automobile industry, and in accordance with the present invention the auxiliary cleaner has a mounting for its wiper arm similar in construction to that of the main cleaner, above described, the same being mounted on a stub or auxiliary shaft 13 which is likewise provided with a transverse bore 14 and an adjacent groove or seat 15 in which the upper ends of the auxiliary wiper arm 16 and auxiliary stirrup 17 are respectively engaged in a manner similar to that described for the arm 5 and stirrup 7 of the main cleaner, the lower end of the wiper arm 16 supporting the auxiliary wiper element 16'. As a simple means of mounting the shaft, a bracket 18 is suitably secured, as by bolts 19, to the front side of the top frame bar 20 of the windshield, the shaft 13 being connected thereto after a swivel fashion so as to permit free rocking movement of said shaft. A coil spring 21 surrounds the wiper arm 16 between the stirrup foot or step 22 and the shaft 13, the same being supported under compression by the stirrup for exerting a resilient influence or force on the wiper arm toward the windshield glass, in a manner similar to the main wiper arm mounting.

A connecting link 23, consisting merely of a length of rod or stiff wire, has its extremities turned forwardly and engaged in apertures 24 provided in the two stirrups 7 and 17 intermediate their ends with the protruding tips of said connecting link being swaged or riveted over, as at 25, to prevent displacement of the link at either end, while permitting of a pivotal relation between the connecting link and the stirrups.

In attaching the auxiliary cleaner to a cleaner embodying a stirrup 7, and after the auxiliary shaft has been properly mounted on the windshield frame, it is only necessary to replace the stirrup of the main cleaner by one of the stirrups embodied within the connector 7, 17, 23, and then hang the companion stirrup over the stub shaft 13, following which the main and auxiliary wiper arms are engaged in the bores 3 and 14 of their respective shafts.

This simple attachment adds only the weight of the connecting link or rod 23 since the remaining parts constitute the component parts of the individual cleaners. The connecter, consisting of the connecting link and its attached stirrups, embodies a construction which enters materially into the operation of either cleaner, since the springs 9 and 21 cooperate with the respective stirrups to urge both cleaner arms toward the windshield glass. This construction also enables an expeditious mounting of the attachment without the use of tools, after the bracket 18 has been attached; the individual wiper arms are not required to be modified by the drilling of holes through them or by the attachment of clamps thereon; and the connecting link 23 is disposed close to the windshield glass and between the latter and the arms 5 and 16 by reason of the fact that the stirrups are so disposed between the wiper arms and the windshield in order to properly urge the wiper elements against the windshield glass.

I claim:

1. A windshield cleaner comprising an operating shaft, an auxiliary shaft, a wiper carrying arm for each shaft detachably interlocked therewith, a spring on each arm, and a connector unit for securing the arms to their respective shafts against displacement therefrom and for transmitting the swinging movement from one arm to the other in synchronism, said connector unit comprising a stirrup member at each end, each stirrup being detachably interlockable both with the adjacent shaft and its wiper carrying arm, each spring being stressed by the adjacent stirrup member for securing the respective wiper carrying arm against accidental displacement from its shaft and acting to hold the respective stirrup member operative.

2. A windshield cleaner comprising an operating shaft, an auxiliary shaft, a wiper carrying arm connected to each shaft, a connector unit between the two arms comprising a member at each end supported on the adjacent shaft and extending therefrom alongside of the respective wiper carrying arm and connected to the latter at a point spaced from the point of connection between the arm and shaft, and a link connecting the two members together as a unit and removable and mountable therewith as a unit from the shafts and wiper carrying arms, said members serving to positively connect the opposite ends of the link to the wiper carrying arms at points on the arms spaced from the connection between the arms and their shafts.

3. In a combination with a main windshield cleaner having an operating shaft, a wiper arm attached thereto, a spring surrounding the arm, and a stirrup engaged at one end about the shaft and at its opposite end about the arm in supporting relation to the spring whereby the wiper arm is urged toward the glass of an adjacent windshield, of an auxiliary cleaner having a wiper arm and means for pivotally attaching the latter to the windshield for swinging in synchronism with the first wiper arm, and a link permanently connected to the stirrup and connecting the second wiper arm to the stirrup of the main cleaner and removable with the stirrup as a unit.

4. In combination with a main windshield cleaner having an operating shaft, a wiper arm attached thereto, a spring surrounding the arm, and a stirrup engaged at one end about the shaft and at its opposite end about the arm in supporting relation to the spring, of an auxiliary cleaner comprising a rockable shaft, a wiper arm connected to the latter, a spring encircling the second arm, a stirrup engaged at one end about the rockable shaft and at its opposite end about the second arm in supporting relation to the adjacent spring, and a link permanently connecting the two stirrups, the link and stirrups being removable as a unit.

5. A windshield cleaner comprising spaced, parallel wiper arms swingingly mounted, means for oscillating one of said arms, a connector joining the two arms for unity in movement, and resilient means cooperating with said connector for urging the wipers of the arms into operative contact with the windshield glass.

6. An auxiliary cleaner for windshield cleaners of the type embodying a shaft having a wiper arm detachably connected thereto with a spring encircling the arm, and a stirrup connected at one end to the shaft and at its opposite end to the arm in supporting relation to the spring, said auxiliary cleaner comprising an auxiliary shaft, an auxiliary wiper arm connected thereto, a connecting rod connected at one end to said auxiliary wiper arm, and a stirrup connected to the opposite end of said connecting rod for replacing the stirrup of the windshield cleaner to which the auxiliary cleaner is to be attached.

7. A connector for tandem windshield cleaners having spaced shafts and oscillatory wiper arms, comprising a rigid link and a pair of members pivotally riveted to the opposite ends of the link, each member being interlockable with the adjacent shaft and wiper arm.

8. A connector for tandem windshield cleaners having spaced shafts and oscillatory wiper arms, comprising a rigid link and a pair of members connected to the opposite ends of the link, each member detachably interlockable at its opposite ends and without the use of tools with the adjacent shaft and wiper arm.

JOHN R. OISHEI.